United States Patent
Miceli

[15] 3,674,046
[45] July 4, 1972

[54] VEHICULAR LOCKING DEVICE

[72] Inventor: James V. Miceli, 44 Bay 40th St., Brooklyn, N.Y. 11232

[22] Filed: July 30, 1970

[21] Appl. No.: 59,378

[52] U.S. Cl............................137/384.2, 137/354, 151/14.5, 85/1 SS
[51] Int. Cl.........................................................F16k 35/06
[58] Field of Search..................137/351, 352, 353, 354, 355, 137/385, 384.2, 384.4; 151/14.5; 85/1 SS

[56] References Cited

UNITED STATES PATENTS

| | | | |
|---|---|---|---|
| 1,515,745 | 11/1924 | Mulrooney et al. | 137/384.2 |
| 1,366,229 | 1/1921 | White | 137/384.2 |
| 2,547,831 | 4/1951 | Mueller | 251/309 X |
| 2,711,717 | 6/1955 | Stacey | 85/1 SS UX |
| 1,835,524 | 12/1931 | Rinehart et al. | 85/4 UX |
| 1,371,975 | 3/1921 | McQueen et al. | 137/384.2 |

FOREIGN PATENTS OR APPLICATIONS

| 156,427 | 1/1921 | Great Britain | 137/384.2 |

*Primary Examiner*—Henry T. Klinksiek
*Attorney*—Friedman & Goodman

[57] ABSTRACT

A vehicular locking device provided with a housing having inlet and outlet ports connected in the fuel feed line of a vehicle, includes a valve that can be rotated into open and closed positions for passing and blocking the fuel flow selectively. A lock is provided in the housing in operative association with the valve so that the valve may be locked as necessary by an authorized operator having a key therefor.

6 Claims, 4 Drawing Figures

PATENTED JUL 4 1972  3,674,046
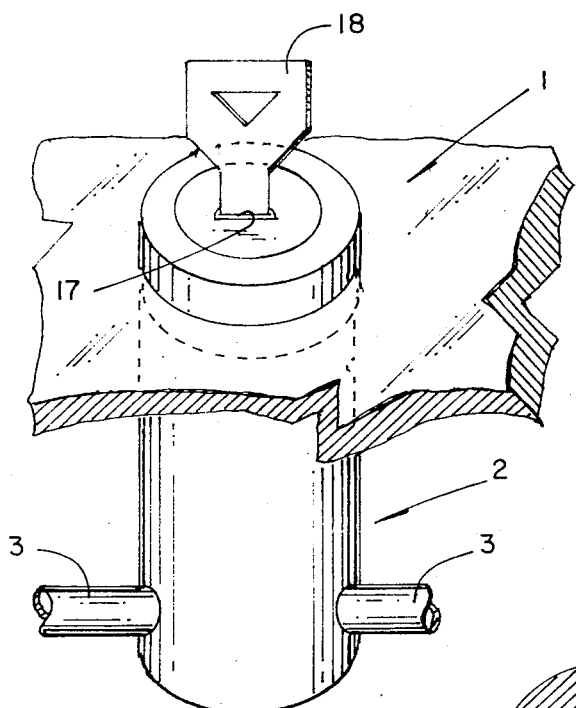
FIG. 1.
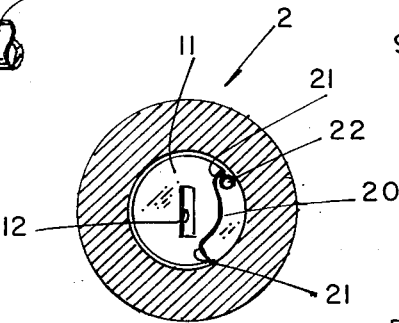
FIG. 3.
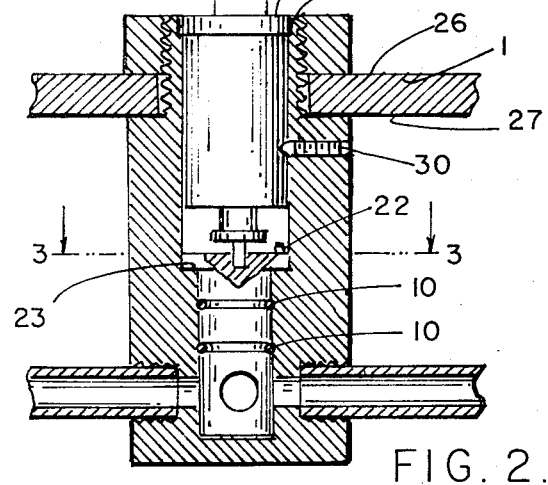
FIG. 2.
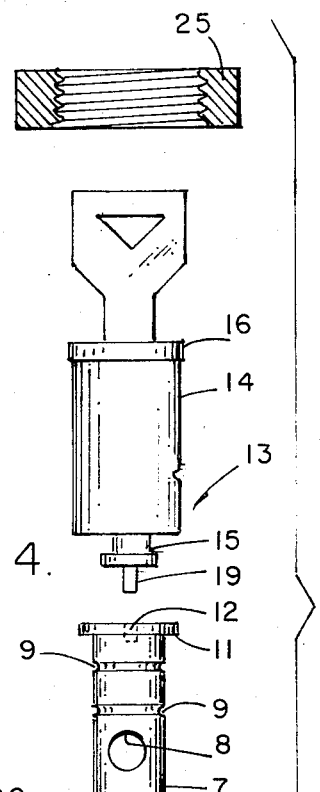
FIG. 4.
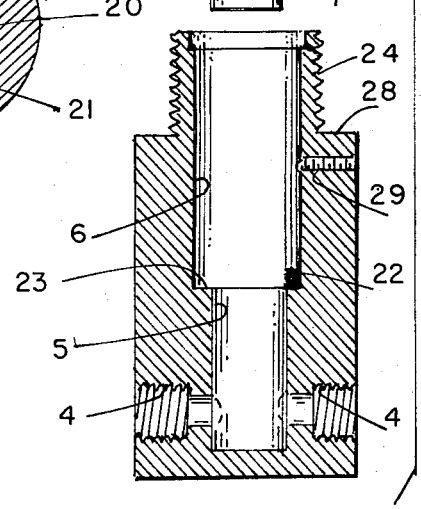
JAMES V. MICELI
INVENTOR
Friedman & Goodman
ATTORNEYS

3,674,046

VEHICULAR LOCKING DEVICE

BACKGROUND OF THE INVENTION

The problem of preventing persons from taking unauthorized possession of automobiles and similar vehicles from storage is an ever increasing one, prompting, heretofore the development of many devices for incorporation in vehicles so as to diminish potential theft and similar unauthorized possession.

Certain of the anti-theft devices developed heretofore are electrical in nature, complex in arrangement, and costly for vehicular owners. Other anti-theft devices are primarily mechanical in nature, easily dismantled by knowledgeable persons skilled in theft, and, therefore ineffective. The purpose of the present invention is to obviate the aforesaid disadvantages by providing a locking device in the fuel feed line of the vehicle. When the owner of the vehicle or other authorized operator desires to store the vehicle, he simply locks the fuel feed line. This prevents unauthorized persons from removing the vehicle upon gaining access therein.

SUMMARY OF THE INVENTION

The present invention relates to anti-theft devices for automobiles and similar vehicles, and more particularly relates to a locking device connected to the fuel feed line of the vehicle, yet accessible for manipulation by the owner or other authorized operator of the vehicle, so that the fuel feed line may be blocked by a valve that may be selectively locked and unlocked.

The primary object of the present invention is to prevent persons from taking unauthorized possession of a vehicle.

A further object of the present invention is to provide means for selectively locking and unlocking the vehicular fuel feed line.

A still further object is to provide a locking device that cannot be dismantled from within the vehicle.

A further object of the present invention is to provide a housing for the locking device that conceals the operative elements therein so as to prevent a direct grasping of the assembled operative elements and the removal thereof.

Still a further object of the present invention is to provide means for securing the operative elements in the housing at a point that is not readily accessible below the floorboard of the vehicle.

A further object of the present invention is to provide a locking device that is arranged simply, manufactured inexpensively, and utilized effectively and reliably.

THese and other objects of the invention are achieved by providing a housing having inlet and outlet ports connected in the fuel feed line of the vehicle. The housing is provided with a valve that can be selectively closed to block the fuel feed line or opened to pass the fuel flow therethrough. The housing is further provided with a lock that is operatively connected to the valve so that the valve can be locked in either the opened or closed positions.

DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment, in which:

FIG. 1 represents a perspective view of the device according to the invention as connected to a portion of the floorboard of a vehicle;

FIG. 2 is a cross-sectional view in elevation of the invention;

FIG. 3 is a cross-sectional view taken along line 3—3 in FIG. 2; and

FIG. 4 is an exploded elevational view, partly in cross-section, of the present invention.

DETAILED DESCRIPTION OF THE DRAWINGS

The present invention as shown in FIG. 1 is illustrated as embodied in a portion of a floorboard 1 of a vehicle. The device according to the invention includes a housing 2. The vehicular fuel feed line 3 is connected to the threaded inlet and outlet ports 4 formed in the housing 1. Also formed in the housing 1 are two coaxial and longitudinally extending bores constituting a lower bore 5 and an enlarged upper bore 6. Rotatably seated in the lower bore 5 is a cylindrical valve 7 having a valve channel 8 extending transversely of its longitudinal axis. The valve 7 may be opened such that the valve channel 8 is rotated into coaxial alignment with the threaded ports 4 so as to permit the passage of fuel therethrough. When the valve channel 8 is rotated so as to be transversely positioned relative to the ports 4, the valve 7 is in its closed condition and the fuel flow is blocked. In order to seal the housing 2, the valve 7 is provided with annular grooves 9 adapted for receiving flexible sealing rings 10, as shown in cross-section in FIG. 2. These sealing rings 10 bear against the cylindrical wall of the lower bore 5. The valve 7 is also formed with an enlarged valve head 11 substantially equal in diameter to that of the upper bore 6 wherein the head 11 is seated. Formed in the valve head 11 is a valve head slot 12 extending longitudinally therein.

Fixedly arranged in the upper bore 6 is a conventional lock 13 having a lock casing 14 in which is rotatably mounted a lock plug 15. The lock plug 15 extends longitudinally throughout the casing 14 and terminates at the upper portion thereof in a lock plug head 16. The details of the lock 13 do not necessarily form the basis of the present invention, as same may be any conventional lock adaptable for seating in the housing 2 as described above, and, therefore, the details thereof are not shown. However, the lock plug 15 is provided with a key slot 17 adapted for receiving a key 18 and includes structure responsive to the rotation of the key 18 so as to permit rotation of the lock plug 15 relative to the fixed lock casing 14. The lower portion of the lock plug 15 includes a latch 19 extending longitudinally so as to seat in the slot 12 formed in the valve head 11. Upon rotation of the key 18, the lock plug 15 rotates, and through the intermediary of the operative association of the latch 19 in the valve head slot 12, the valve 7 is caused to rotate so as to be selectively opened or closed as described above.

In order to assure that the valve channel 8 is movable from an open position coaxial with the ports 4 to a closed position transversely relative thereto, the valve head 11 is provided with an arcuate groove 20 having side walls 21 spaced relative to one another arcuately over approximately 90°. Extending into the arcuate groove 20 for cooperation with the side walls 21, is a projection 22 formed as part of the lower portion 23 of the upper bore 6.

The housing 2 is provided at its upper end with a cylindrical externally threaded portion 24 of reduced diameter. A housing cap-ring 25 is provided for securing the housing 2 to the vehicular floorboard 1. In this respect, the threaded portion 24 of the housing 2 projects through an opening in the floorboard 1 such that the cap-ring 25 engages the upper surface 26 of the floorboard 1 with the lower surface 27 of the floorboard 1 being engaged by the housing shoulder 28. In this manner the housing 2 is fixed to the vehicle with the vehicular floorboard interposed between the cap-ring 25 and the shoulder 28.

Formed in the housing 2, below the shoulder 28 and therefore below the lower surface 27 of the floorboard 1, is a threaded opening 29 extending transversely of the upper bore 6. A set-screw 30 is threadedly secured in the opening 29 for engagement with the lock casing 14 so as to prevent the rotation and axial displacement thereof. The set-screw 30 is fully concealed by the floorboard 1 and is therefore inaccessible to permit the removal of the lock casing 14 from the housing 2. Furthermore, it is expedient to sink the set-screw 30 below the outer surface of the housing 2 and to fill in the exposed volume in the opening 29 with a plastic substance such as an epoxy resin to further conceal the set-screw 30 from accessibility to prevent unauthorized dismantling of the device.

Another feature with regard to the prevention of an unauthorized dismantling of the device is that of extending the uppermost portion 31 of the housing 2 so as to be above or at least flush with the uppermost face of the plug head 16. This prevents a direct grasping of the plug head 16 upon an unauthorized removal of the cap-ring 25. In order to remove the internal elements from the housing 2 such as the lock 13 to expose the valve 7 for manipulation thereof from a closed position into an open position, the entire housing 2 would have to be disassembled from the fuel line 3 in the vehicle, which action clearly obviates the possibility and desirability to take unauthorized possession thereof.

It should be quite apparent at this point that the present invention affords means for preventing the theft of a vehicle in a manner that is effective and reliable. In operation of the device, according to the invention, an authorized operator having a key simply places the key 18 into the key slot 17 of the lock 13. He then turns the key and thereby the lock plug 15. The valve 7 which is operatively connected to the lock plug 15 is caused to similarly turn. The projection 22 which cooperates with the side walls 21 of the arcuate groove 20 limits the extent of turn for the valve so that the valve channel can be placed into alignment with the ports 4 or transversely relative thereto and selectively locked into these alternate positions.

The location of the set-screw 30 and the relationship of the uppermost portion 31 of the housing 2 with the uppermost face 32 of the plug head 16 prevents unauthorized tampering with the valve 7 and the theft of the vehicle.

Numerous alterations of the structure herein disclosed will suggest themselves to those skilled in the art. However, it is to be understood that the present disclosure relates to a preferred embodiment of my invention which is for purposes of illustration only and not to be construed as a limitation of the invention.

What is claimed is:

1. A locking device for a fuel feed line of a vehicle, the fuel feed line being disposed adjacent to an outer surface of a partition of the vehicle, said locking device comprising a one piece unitary housing, said housing being provided with two coaxial and longitudinally extending bores constituting an inner bore and an enlarged outer bore, said housing further being provided with transversely extending inlet and outlet passages communicating with said inner bore for receiving the fuel feed line, valve means disposed in said inner bore and interposed between said inlet and outlet passages, said valve means being movable from an open position to a closed position for selectively opening and closing communication between said inlet and outlet passages, said valve means including a cylindrical member rotatably disposed in said inner bore, said cylindrical member having a passageway extending transversely for alignment with said inlet and outlet passages in said open position upon rotation of said cylindrical member, sealing means interposed between said cylindrical member and said inner bore to seal said outer bore from said inlet and outlet passages, locking means operable within an interior of the vehicle for locking said valve means in said open and closed positions selectively, said locking means including a casing disposed within said outer bore, means securing said casing to said housing to prevent rotation and axial displacement of said casing relative to said housing, said casing securing means being inaccessible from within the vehicle to prevent unauthorized dismantling of said locking device from within the vehicle, said casing securing means including a threaded set-screw seated in a threaded opening in said housing and extending into said outer bore for transverse engagement with said casing, said locking means including a plug rotatably supported in said casing, said plug including an extending portion operatively associated with said cylindrical member of said valve means, said cylindrical member being provided with a slot, said extending portion of said plug projecting into said slot in said cylindrical member for moving said valve means selectively into said open and closed positions, means securing said housing to the outer surface of the partition of the vehicle, said housing including a first portion abutting the outer surface of the partition of the vehicle and a reduced second portion extending through an opening in the partition into the interior of the vehicle, said first portion of said housing being larger than the opening in the partition, said housing securing means being disposed within the interior of the vehicle in engagement with said second portion of said housing such that the partition is engagingly interposed between said first portion of said housing and said housing securing means, said second portion of said housing being externally threaded, and said housing securing means being an internally threaded cap-ring threadedly associated with said second portion of said housing.

2. A locking device as claimed in claim 1, wherein said cylindrical member is provided with at least one annular groove, said sealing means including an annular ring seated in said annular groove.

3. A locking device as claimed in claim 1, wherein said housing includes an abutment, said valve means including a portion engageable with said abutment upon the rotation of said plug, said abutment limiting the extent of rotation of said valve means to 90°.

4. A locking device as claimed in claim 3, wherein said cylindrical member includes a valve head portion, said valve head portion being provided with an arcuate groove having side walls spaced relative to one another arcuately over approximately 90°, said abutment extending into said arcuate groove for cooperation with said side walls, said abutment being a projection disposed in said outer bore.

5. A locking device as claimed in claim 1, wherein said set-screw is fully embedded in said threaded opening, said locking device further including covering means seated in said threaded opening adjacent said set-screw for further concealing said set-screw.

6. A locking device as claimed in claim 1, wherein said locking means includes an upper portion disposed within said first portion of said housing, said upper portion being provided with a slot adapted for receiving a key, said first portion extending circumferentially about said upper portion so that exposed ends of each are flush to prevent grasping and removal of said plug from the interior of the vehicle.

* * * * *